(12) United States Patent
Wang

(10) Patent No.: US 8,485,063 B2
(45) Date of Patent: Jul. 16, 2013

(54) DEVICE FOR ASSEMBLING/DISASSEMBLING BICYCLE PEDALS AND ASSEMBLY FOR CONTROLLING ASSEMBLING/DISASSEMBLING BY ONE STEP

(76) Inventor: Dongjun Wang, Guangdong (CN)

( * ) Notice: Subject to any disclaimer, the term of this patent is extended or adjusted under 35 U.S.C. 154(b) by 46 days.

(21) Appl. No.: 12/825,831

(22) Filed: Jun. 29, 2010

(65) Prior Publication Data

US 2010/0326234 A1  Dec. 30, 2010

Related U.S. Application Data

(63) Continuation of application No. PCT/CN2008/073824, filed on Dec. 29, 2008.

(30) Foreign Application Priority Data

Dec. 29, 2007  (CN) .......................... 2007 1 0125631

(51) Int. Cl.
*B62M 3/00* (2006.01)
(52) U.S. Cl.
USPC ........................ 74/594.2; 74/594.1; 74/594.7
(58) Field of Classification Search
USPC .......... 74/594.1–594.7; 482/57; 280/259–261
See application file for complete search history.

(56) References Cited

U.S. PATENT DOCUMENTS

| 14,107 | A | * | 1/1856 | Reynolds et al. | 49/56 |
| 652,888 | A | * | 7/1900 | Wells | 36/32 R |
| 700,492 | A | * | 5/1902 | Henstock | 74/594.7 |
| 706,028 | A | * | 8/1902 | Cullen | 74/594.7 |
| 1,091,405 | A | * | 3/1914 | Trambley | 74/594.7 |
| 1,122,342 | A | * | 12/1914 | Westerberg | 74/594.7 |
| 1,243,165 | A | * | 10/1917 | Harley | 74/594.7 |
| 1,276,139 | A | * | 8/1918 | Warren | 74/594.7 |
| 2,536,466 | A | * | 1/1951 | Rippenbein | 74/594.7 |
| 2,641,249 | A | * | 6/1953 | Brockman | 74/594.4 |
| 3,422,701 | A | * | 1/1969 | Boisis | 74/594.7 |
| 6,298,740 | B1 | * | 10/2001 | Bridges | 74/594.2 |

FOREIGN PATENT DOCUMENTS

| CN | 1590210 A | 3/2005 |
| CN | 1814499 A | 8/2006 |
| CN | 101214846 A | 7/2008 |
| FR | 2726803 A1 | 5/1996 |
| JP | 2000-95164 A | 4/2000 |
| JP | 2003-154985 A | 5/2003 |
| WO | 02/100711 A1 | 12/2002 |

OTHER PUBLICATIONS

International Search Report Dated Apr. 9, 2009.

* cited by examiner

*Primary Examiner* — Phillip A Johnson
*Assistant Examiner* — Daniel Yabut
(74) *Attorney, Agent, or Firm* — Norris McLaughlin & Marcus PA

(57) ABSTRACT

A device for disassembling and assembling bicycle pedals comprises a bicycle crank (1), detachable pedals (17) connected with the crank (1), a fixing seat (11) arranged at an end of the crank (1), a control device arranged at the fixing seat (11) and a connection assembly between a pedal (17) and the control device. The control device also comprises an unlocking mechanism, a pushing mechanism and a rotating mechanism, wherein the pushing mechanism and the rotating mechanism are controlled by a gear mechanism. The device can conveniently and quickly disassembling and assembling bicycle pedals by one step without touching the pedals with hands.

9 Claims, 12 Drawing Sheets

DEVICE FOR ASSEMBLING/DISASSEMBLING BICYCLE PEDALS AND ASSEMBLY FOR CONTROLLING ASSEMBLING/DISASSEMBLING BY ONE STEP

This application is a Continuation of application no. PCT/CN2008/073824 filed Dec. 29, 2008, which claims priority to the Chinese application 200710125631.6 filed Dec. 29, 2007.

FIELD OF THE INVENTION

The invention relates to a device for disassembling and assembling bicycle pedals.

BACKGROUND OF THE INVENTION

Bicycles are one of the most prevalent vehicles. Since the amount of bicycles increases progressively, and the size of a bicycle frame is relatively large, bicycles takes up more space. Specially, bicycle pedals bring unnecessary width while the bicycle is parked. Currently, bicycles mainly adopt two types of pedals, such as folding-type pedals and quick disassembling-type pedals.

In the folding-type pedals, a pedal body can be folded. However, since the pedal body can be folded, the intensity of this type of pedal is usually insufficient. Therefore, the pedal will possibly be damaged under an excessive force.

In the quick disassembling-type pedals, a coupler fixed to a crank of a bicycle is provided between the crank and one of the pedals. By toggling a lock-up mechanism, the pedal can disengage from or fit in the coupler of the crank. However, the disassemble-type pedals, after being disassembled, must be placed at other locations or carried with users, which brings the users some degree of inconvenience.

Meanwhile, the pedals are located at a low level and distributed on each side of the bicycle frame respectively. The above two types of pedals not only bring users inconvenience, but also dirty the users' hands when the pedals are folded or disassembled.

SUMMARY OF THE INVENTION

Technical Problem

The present invention is aimed to provide a device for disassembling and assembling bicycle pedals without touching the pedals with users' hands. The present invention also provides an assembly for controlling the disassembling and assembling by one step. That is to say, the bicycle pedals can be disassembled and assembled by one step without touching the pedals with hands.

Technical Solution

One object of the invention is to provide a device for disassembling and assembling bicycle pedals. The device comprises a crank; detachable pedals connected with the crank; a fixing seat arranged at an end of the crank; a control device arranged at the fixing seat; a connection assembly between a pedals and the control device; an unlocking mechanism; a pushing mechanism; and a rotating mechanism, wherein the pushing mechanism and the rotating mechanism are controlled by a gear mechanism.

The gear mechanism for controlling the pushing mechanism and the rotating mechanism at least comprises: a gear; and a driving rack and a driven rack which are engaged with said gear.

The crank is provided with a fixing seat at an end at which the control device is not arranged. The fixing seat is at least provided with a dual gear. The driving rack has teeth engaged with the dual gear.

A locating block for controlling a rotation of the pedal is provided on the driving rack. The locating block controls the pedal to start a rotating process after the pedal exits from the crank, due to a limiting relationship between the locating block and a support frame under procedures.

The connection assembly directionally moves on a support frame. The support frame is provided with a limiting structure for limiting the movement of the pushing mechanism. A gear of the connection assembly and the support frame are coaxially pivoted to the fixing seat at the end of the crank.

The connection assembly comprises a linkage. The line between two pivotal joints at both ends of the linkage is always parallel with an axis of an axle of the pedal when the pedal does not rotate.

One of the pivotal joints at the both ends of the connection assembly is fixed with the support frame, while the other one of the pivotal joints is fixed with the pedal indirectly. A pivotal joint in a middle part of the linkage, which is collinear with the pivotal joints at the both ends of the connection assembly, is pivotably joined with the driven rack so as to carry out a pushing process of the pedal at a certain transmission ratio.

Another object of the invention is to provide an assembly for controlling, by one step, disassembling and assembling the device as described above. The assembly comprises two devices for disassembling and assembling a pedals at both sides of a bicycle, respectively and independently; a central actuating mechanism for controlling the two devices for disassembling and assembling the pedals independently; and a central control seat fixed to a bottom bracket, for fixing the central control mechanism, wherein an actuating ring is at least provided at the bearing between the central actuating mechanism and one of the two devices at one side of the bicycle.

The central actuating mechanism at least comprises a gear and a rack engaged with the gear.

The actuating ring is at least fixed with a rack at a side.

The trajectory of the actuating ring is parallel with an axis of the bottom bracket the bicycle.

At contact points between the actuating ring and a transmission mechanism in the central actuating mechanism, balls are provided to reduce frictions.

Technical Effect

As a result, the device for disassembling and assembling bicycle pedals and the assembly for controlling the disassembling and assembling by one step according to the present invention have advantages of disassembling and assembling bicycle pedals without touching the pedals with users' hands. Furthermore, the operation of the actuating mechanism can couple other folding steps. This can conveniently and quickly disassemble and assemble the bicycle pedals.

DESCRIPTION OF THE PREFERRED EMBODIMENTS

Figure 1:
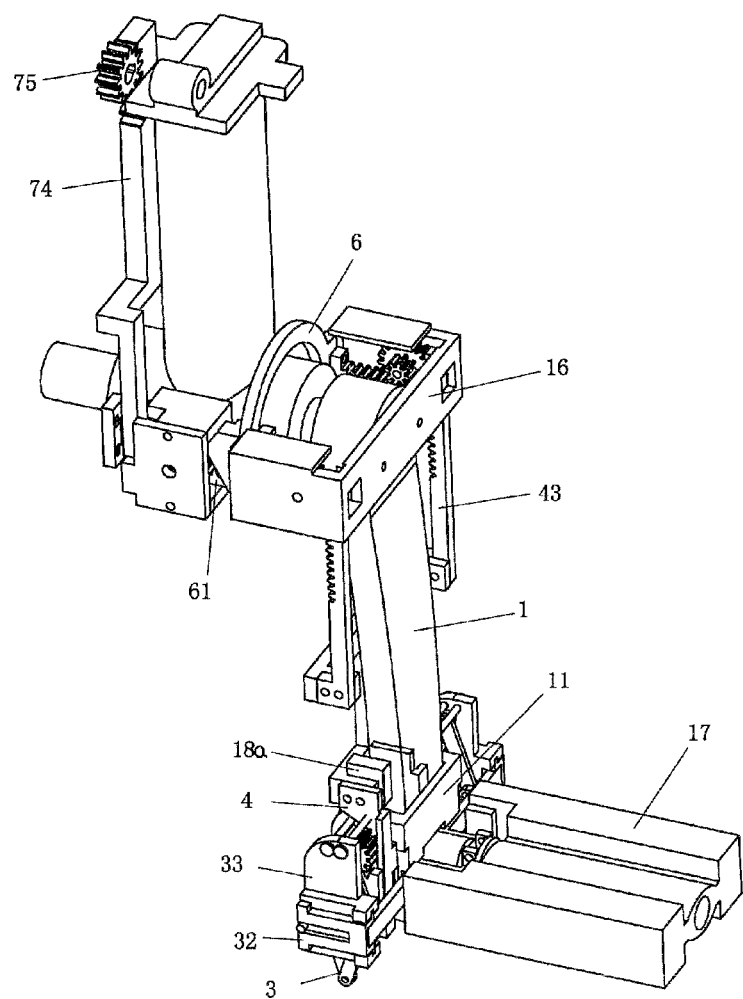
FIG. 1 is a perspective view schematically showing the structure of example 1 of the invention.

The invention will be further illustrated by various examples with reference to attached drawings. A first embodiment of the presently claimed invention is directed to central control device, comprising: a driving mechanism; a transmission rack on each of two sides of the driving mechanism; and two actuating rings arranged between the driving mechanism and the transmission rack so that the driving mechanism is rotatably connected to the transmission rack wherein the transmission rack is rotatable relative to the driving mechanism,wherein the driving mechanism drives each of the actuating rings to move in a direction parallel to an axis of the actuating rings, and a driving effect of the driving mechanism is synchronously outputted by the transmission rack at each side of the driving mechanism through the two actuating rings. Yet another embodiment of the invention relates to a device for disassembling and assembling pedals synchronously, comprising:a locking mechanism for locking or unlocking a pedal relative to a crank; a driving mechanism; two actuating rings, each of which is connected with at least two transmission rack so that the driving mechanism is rotatably connected with the transmission rack wherein the driving mechanism drives each of the actuating rings to move in a direction parallel to an axis of the actuating rings;a motion mechanism, comprising: a connection assembly which is pivotably joined with the crank at one end and connected with the pedal at the other end; a motion control device for controlling the connection assembly so that the pedal is displaced a predetermined distance and rotated a predetermined angle relative to the crank wherein a driving effect of the driving mechanism is outputted to the motion control device at each end of a bottom bracket through the transmission racks which are connected with the two actuating rings respectively, so that the pedals at both ends of the bottom bracket are synchronously displaced a predetermined distance and rotated a predetermined angle relative to the crank, andwherein the motion control device at each end of the bottom bracket is rotatable relative to the driving mechanism. The motion control device comprises a pushing control mechanism, configured to drive the pedal to displace relative to the crank, the pushing control mechanism comprising: a pushing rack a pushing driven rack, and a pushing transmission gear is engaged with the pushing rack and the pushing driven rack, wherein the pushing driven rack comprises a first rack and a second rack hinged to each other, wherein the first rack or the second rack is fixed with the pedal at unhinged end thereof, wherein the pushing driven rack and the pushing transmission gear are arranged on a fixing frame pivotably joined with a fixing seat at the end of the crank; and a rotation control mechanism, configured to drive the pedal to rotate relative the crank, the rotation control mechanism comprising a rotating rack, a rotation transmission gear and a rotation limiting mechanism configured to limit the rotating rack from driving the rotation transmission gear to rotate,wherein the pushing transmission gear is coaxially pivoted with the rotation transmission gear; and wherein the rotation transmission gear is fixed relative to the fixing frame.

Example 1

A device for automatically disassembling and assembling bicycle pedals and an assembly for controlling the disassembling and assembling by one step are shown in FIGS. 1-5. In order to facilitate illustration, only one bicycle pedal is shown together with mechanisms connected thereto. In the figures, a fixing seat 11 is fastened to an end of a crank 1. An unlocking mechanism comprises a pedal 17 provided with an annular groove 131 at an end of an axle thereof; a coupler 12 fixed on the crank; a clamper 14 with a tuber, matching with the annular groove 131; and an unlocking bar 41 for controlling the movement of the clamper 14. The unlocking bar 41 is fixed with a driving rack 4 of a pushing mechanism and a rotating mechanism of the pedal 17 as well as a transmission rack 43 at a bottom bracket, so as to form a general actuating assembly. The fixing seat 11 forms, on its inner face relative to the crank 1, a concave for merely limiting the directional movement of the damper 14. That is to say, the crank is situated between the unlocking mechanism and the pedal. The damper 14 is provided with balls 15 for reducing frictions with the concave of the fixing seat. The movement of the clamper 14 can be controlled by pulling the unlocking bar 41, such that the clamper 14 snaps into or exits from the end of the axle of the pedal so as to control the unlock or lock state of the pedal.

Figure 2:
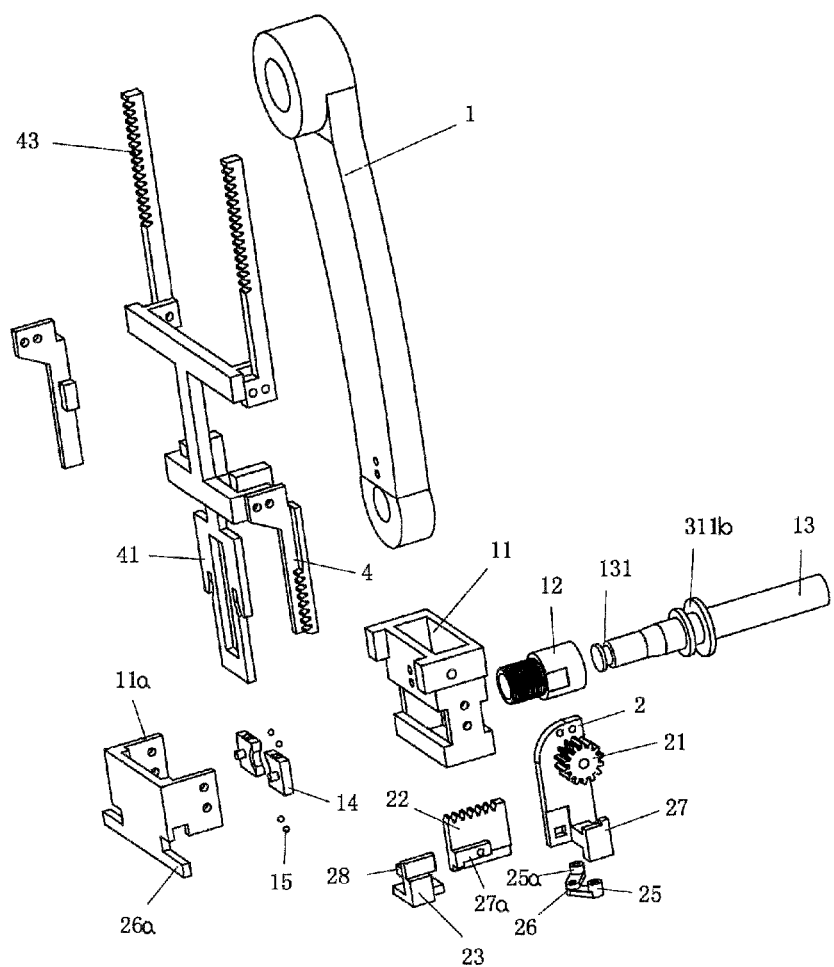
FIG. 2 is an exploded view showing the structure of example 1 of the invention.
Figure 3:
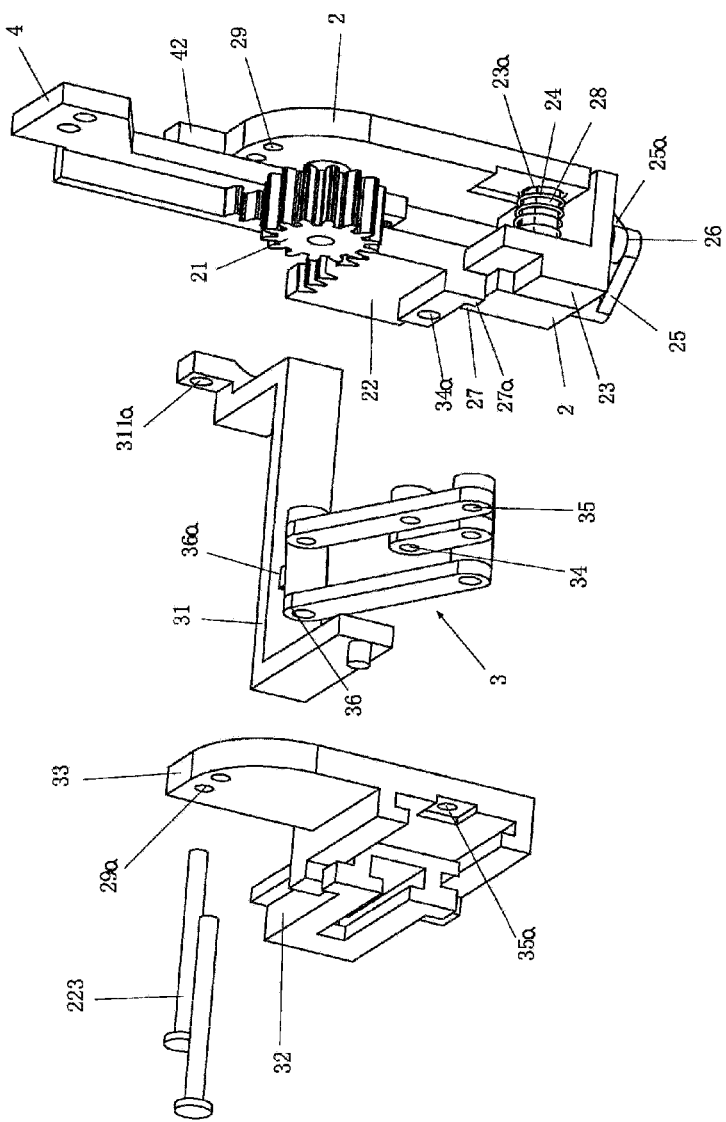
FIG. 3 is a partial exploded view showing a control device when a pedal just enters into a rotating process according to example 1 of the invention.

Referring to FIG. 2 and FIG. 3, a support frame 2 is pivotably joined with the fixing seat 11 on the crank 1. A connection assembly comprising sliders 31, 32 and 33 can directionally move on the support frame 2. The support frame 2 has a limiting stopper 27 for limiting the movement of a driven rack 22 of the pushing mechanism, and a locating hole 23a for limiting the slide of a locking piece 23. Meanwhile, the sliders 31, 32 and 33 constitute three sliding assemblies slidable directionally, each having a limiting structure for limiting the movement between each other. That is to say, when the sliders are completely pulled apart, the total length of the three sliders will not exceed a predetermined value which is longer than the travel distance of the pedal axle 13 completely exiting from the coupler 12, due to their limiting structures.

An aperture 29a in the slider 33 is fixed with an aperture 29 in the support frame 2 via a rivet 223. In addition, an aperture 35a in the slider 33 is hinged to an aperture 35 at one end of a linkage 3, while an aperture 36a of the slider 31 is hinged with the other end 36 of the linkage. An end protrusion 311a of the slider 31 is fixed with an annular groove 311b of the pedal axle. The pedal 17 is indirectly connected with the support frame 2 via the slider 31 of the three sliding assemblies, and can move directionally relative to the support frame (the movement in a pushing process of the pedal). As the travel distance of the pedal 17 exiting from the crank 1 is relatively long, in order to prevent the interference between the pushing mechanism and a chain of the bicycle, the driven rack 22 has an aperture 34a hinged with an aperture 34 in the middle part of the linkage, such that the travel distance of the driven rack 22 is scaled up by the linkage 3. An end hinge 35 of the linkage 3 is hinged with the aperture 35a of the slider 33, and the slider 33 is fixed with the support frame 2, therefore, the end hinge point 35 is indirectly fixed to the support frame 2 through the slider 33. The hinge point 36 at the other end of the linkage 3 is hinged with the slider 31, and the slider 31 is fixed to the pedal, therefore, the hinge point 36 of the linkage 3 is fixed with the pedal 17 indirectly.

As such, the driving rack 4 drives the driven rack 22 via the gear 21 on the support frame 2, and then the driven rack 22 pushes the sliding assemblies with a certain travel distance ratio, such that the pedal fixed to an end of the sliding assemblies exits from the coupler 12 of the crank 1.

When the pedal driven by the driven rack 22 does not exit from the coupler 12, the locking piece 23 moving in a direction perpendicular to the moving direction of the driven rack 22 is always situated between the support frame 2 and the driven rack 22. The locking piece 23 is provided with a locating block 28 which fits into the locating hole 23a of the support frame. The locating block 28 is sheathed with a spring 24 which is arranged between the locking piece 23 and the support frame 2. The spring 24 applies a force to the locking piece 23 which in turn presses the driven rack 22. When the driven rack drives the pedal to exit from the coupler 12, the locking piece 23 abuts against the rear end of the driven rack 22 into a lock-up position under the elastic force of the spring 24, in order to prevent the driven rack 22 from traveling backwards. The locking piece 23 and the support frame 2 are hinged to a linkage having two parts for unlocking. Said linkage having two parts is formed of a rod 25 and a rod 25a hinged together. The end of the rod 25 which is not hinged with the rod 25a is hinged to the bottom of the support frame 2. The end of the rod 25a which is not hinged with the rod 25 is hinged to the bottom of the locking piece 23. Therefore, when the hinged end 26 of said linkage having two parts is pressed, the locking piece 23 will be moved in a direction opposite to the direction in which the spring 24 is applying a force, such that the locking piece 23 will move away from the lock-up position to an unlocked position.

Figure 4:
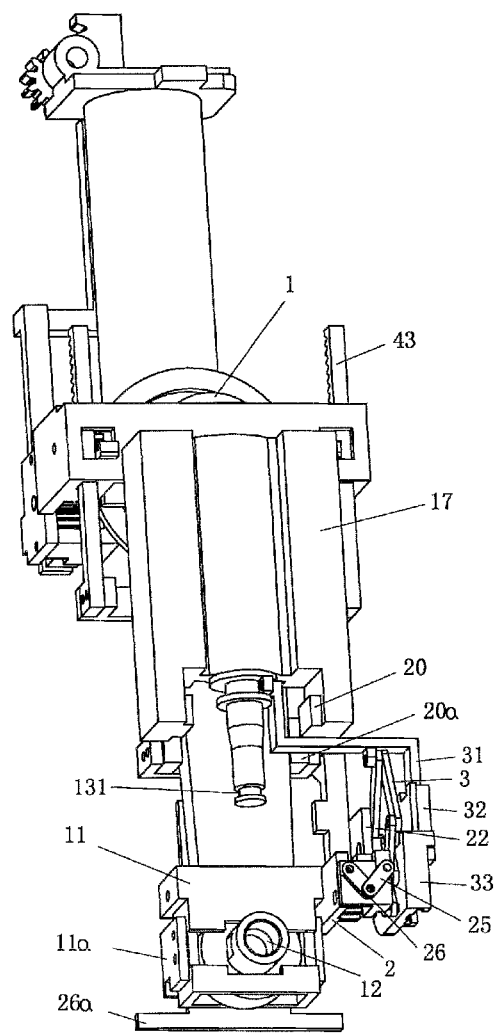
FIG. 4 is a perspective view showing the pedal after it separates from a crank and rotates according to example 1 of the invention.

Referring to FIG. 3 and FIG. 4, when the rotating mechanism does not operate or the rotating mechanism has restored back, an end 26a of a fixing seat cap 11a just presses the hinged end 26 of the linkage having two parts, to keep the unlocked state. When a rotating process is started, the hinged end 26 of the linkage having two parts is released from the end 26a of the fixing seat cap 11a such that the locking piece 23 enters into the lock-up position in which the driven rack 22 is prevented from traveling backwards.

In addition, the support frame 2 is provided with a limiting stopper 27 corresponding to a bump 27a on the driven rack 22. Therefore, the travel distance of the driven rack 22 is controlled by the limiting stopper 27 within a certain travel distance. Furthermore, when the driven rack is brought to the designed travel distance which is sufficient for the pedal to exit from the coupler 12 of the crank, the pedal starts to rotate relative to the crank. As a result, when the driving rack 4 drives the driven rack 22 so as to cause the pedal to exit from the coupler 12 of the crank, a limiting stopper 42 of the driving rack 4 always contacts with the support frame 2 to prevent the support frame 2 from rotating. When the driving rack 4 drives the driven rack 22 to reach the limiting stopper 27 on the support frame, the driven rack 22 cannot continue to move. At this time, the limiting stopper 42 of the driving rack 4 just disengages from the support frame 2. As a result, when the driving rack 4 continues to move in the original direction, the support frame 2 is no longer limited by the limiting stopper 42 of the driving rack, and then the pedal starts to rotate.

As such, at the beginning of the rotating process, the hinge point 26 of the linkages 25 and 25a with both ends hinged to the support frame 2 and the locking piece 23 respectively, is no longer limited by the end 26a of the fixing seat 11. The locking piece 23 then abut against the end of the driven rack 22 under the elastic force of the spring 24 to prevent the driven rack 22 from traveling backwards. In the circumstance, when the pedal completely exits from the coupler 12 of the crank and starts to rotate, the movement of the driven rack 22 is limited in both directions by the limiting stopper 27 on the support frame and the locking piece 23 slidable on the support frame. Therefore, the movement of the linkage 3 hinged to the driven rack 22 and the movement of the sliding assemblies hinged to the end of the linkage is limited. Meanwhile, the slider 33 of the sliding assemblies is fixed with the support frame 2, so after the pedal fixed to the slider 31 exits from the coupler 12 of the crank 1, it is indirectly fixed to the support frame 2 during the rotating process. When the driven rack 22 is not driven by the driving rack 4, the driving rack 4 starts to drive the support frame 2, such that the pedal indirectly fixed to the support frame 2 starts to rotate.

The pedal 17 can rotate relative to the pedal axle. A magnet 20 is fixed at a certain position of the pedal 17. A magnet 20a corresponding to the magnet 20 is fixed at a corresponding position of the general actuating assembly. In this situation, in the rotating process of the pedal 17, the magnet 20 cooperate with the magnet 20a on the general actuating assembly, so that the surface of the rotated pedal 17 is substantial parallel to the crank 1, and thus the width of the bicycle is further reduced after the pedal is folded, as shown in FIG. 4.

If a user wants to let the pedal restore back to be fastened in the coupler 12 of the crank, he can just pull an actuating rack in an inverse direction, and then the corresponding rotating, pushing and fastening processes are performed.

Figure 5:
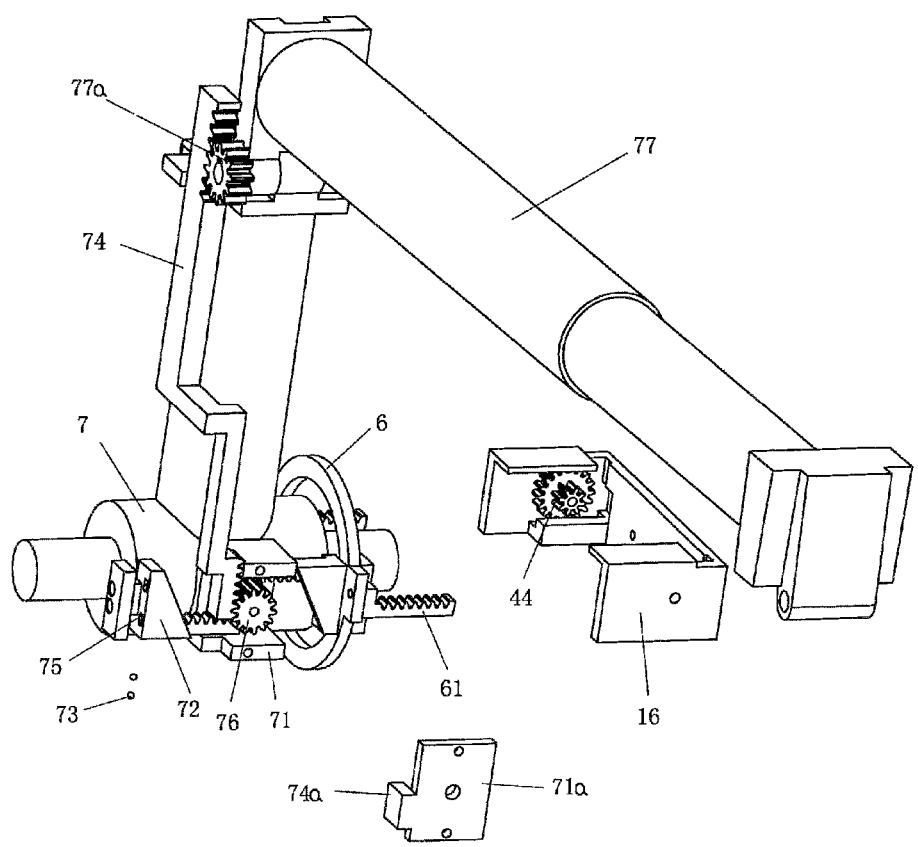
FIG. 5 is a partial perspective exploded view showing the an assembly for controlling the disassembling and assembling by one step according to example 1 of the invention.

Referring to FIG. 5, in order to control the pedals 17 at both sides of the bottom bracket of the bicycle by one step, a central control seat 71 is fixed on the bottom bracket 7 of the bicycle. A central control enclosure 71a is fixed on the central control seat. An edge 74a of the central control enclosure 71a serves as a sliding guide of an actuating rack 74. A gear 76 is fixed to the central control seat 71 and engages with the actuating rack 74 and a pushing rack 72. The pushing rack 72 is provided, at one end, with a groove 75 which may contain an actuating ring 6. The groove 75 is provided with balls 73 on a face contacting with the actuating ring 6 so as to reduce frictions therebetween. The inner face of the actuating ring has a ring shape, such that when the crank rotates, the central actuating mechanism can contact with the groove 75 of the pushing rack 72 with even angles. In addition, the actuating rack 74 engages with a gear 77a. The gear 77a is coaxially fixed to a seat post 77. In the circumstance, when the seat post is bended, the gear 77a and the actuating rack 74 engaged with the gear 77a are driven. The actuating rack 74 drives the pushing rack 72 via the gear 76. Then the pushing rack 72 drives the actuating ring 6 to move in a direction parallel to the axis of the bottom bracket. Therefore, a rack 61 fixed to the actuating ring 6 drives the dual gear 44 which is arranged on a fixing seat 16 and engages with the rack 61, and the transmission rack 43 being a part of the general actuating assembly is driven. As a result, through the step of bending the seat post 77, and through cascade coupling drive, the downstream unlocking, pushing and rotating processes are performed by a simple process of bending the seat post so as to achieve the object of the invention.

In addition, the actuating ring 6 can also be fixed to the pushing rack 72, and the rack 61 engaged with the dual gear 44 is not fixed to the actuating ring 6. Moreover, like the pushing rack 72, a groove 75 is formed at one end of the rack 61 for containing the actuating ring 6. The groove 75 is further provided with balls for reducing frictions with the actuating ring 6. This can also achieve the object of the invention.

Example 2

In this example, in order to make the pedals directionally move relative to the axis of the pedal coupler, the sliding assemblies described in example 1 are removed. Instead, a linkage is used, of which a pivotal joint is fixed to the pedal indirectly and another pivotal joint may move directionally relative to the coupler of the pedal. As such, the two pivotal joints on the linkage can ensure the directional movement of the pedal.

Figure 6:
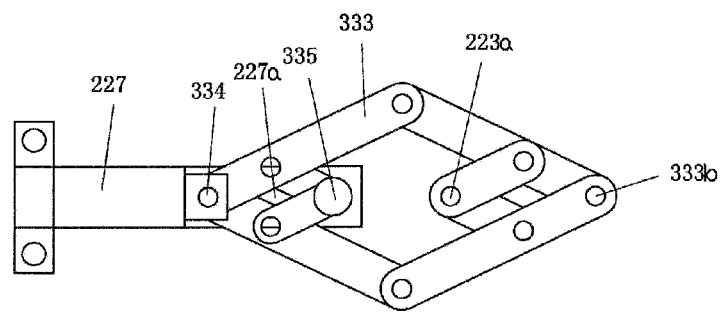
FIG. 6 is a perspective exploded view showing the structure of a control device according to example 2 of the invention.
Figure 7:
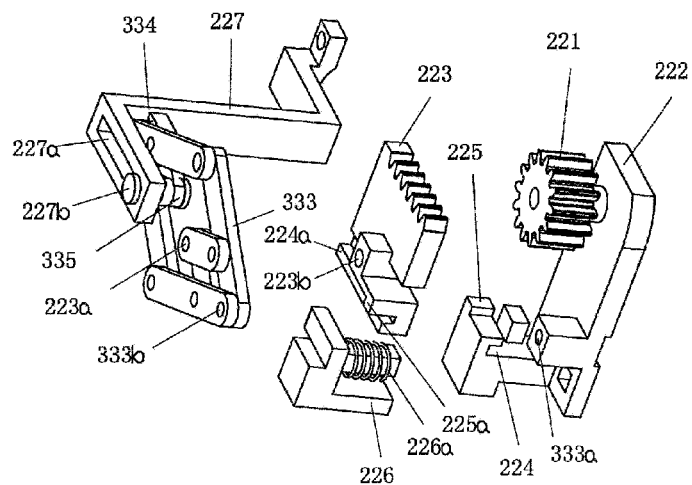
FIG. 7 is a schematic view showing another structure of example 2 of the invention.

Referring to FIGS. 6 and 7, a fixing frame 222 is pivotably joined to the fixing seat at the end of the crank in the same way as that of example 1. A gear 221 is pivotably joined on the fixing frame 222. Meanwhile, the fixing frame 222 is also provided with a chute 224 and a limiting stopper 225 for limiting a driven rack 223. The driven rack is also provided with a tuber 224a corresponding to the chute 224 of the fixing frame 222, and a stopping protrusion 225a. There are locking piece 226 and a spring 226a as those in example 1. A pivotal joint 333b at one end of a linkage 333 is pivotably joined with an aperture 333a in the fixing frame 222, while a pivotal joint 223a in the middle part of the linkage 333 is pivotably joined with an aperture 223b in the driven rack 223. Moreover, a pivotal joint 334 at the other end of the linkage 333 is fixed to a fixing block 227 of the pedal, while another pivotal joint 335 in the middle part of the linkage is hinged with a post 227b which can move directionally in a groove 227a of the fixing block 227. In addition, the pivotal joints 333b and 334 at two ends of the linkages are collinear with the pivotal joints 223a and 335 in the middle parts of the linkages. The line on which the four joints are located is always parallel to the axis of the pedal axle when the pedal does not rotate.

As such, the fixing block 227 maintains its directional movement through the pivotal joint 334 at the end of the linkage which is fixed to the fixing block 227, and through the post 227b hinged to the pivotal joint 335 in the middle part of the linkage. In addition, the linkage maintains its directional movement through the pivotal joint 223a pivoted to the driven rack 223, and through the pivotal joint 333b pivoted to the fixing frame. Therefore, in a pushing process of the pedal, the pedal fixed to the fixing block 227 is always moving in a direction parallel to the axis of the pedal axle. After the pushing process of the pedal finishes, the pedal is stationary relative to the fixing frame 222, due to the locking piece 226 and the limiting stopper 225 on the fixing frame 222. When the pedal starts to rotate, an actuating rack engages with the gear 221, and then drives the fixing frame 222 to rotate, such that the pedal being stationary relative to the fixing frame 222 enters into a rotating process. Similar to example 1, one rack (a continuous gear mechanism) can be used to drive three processes step-by-step.

Figure 8:
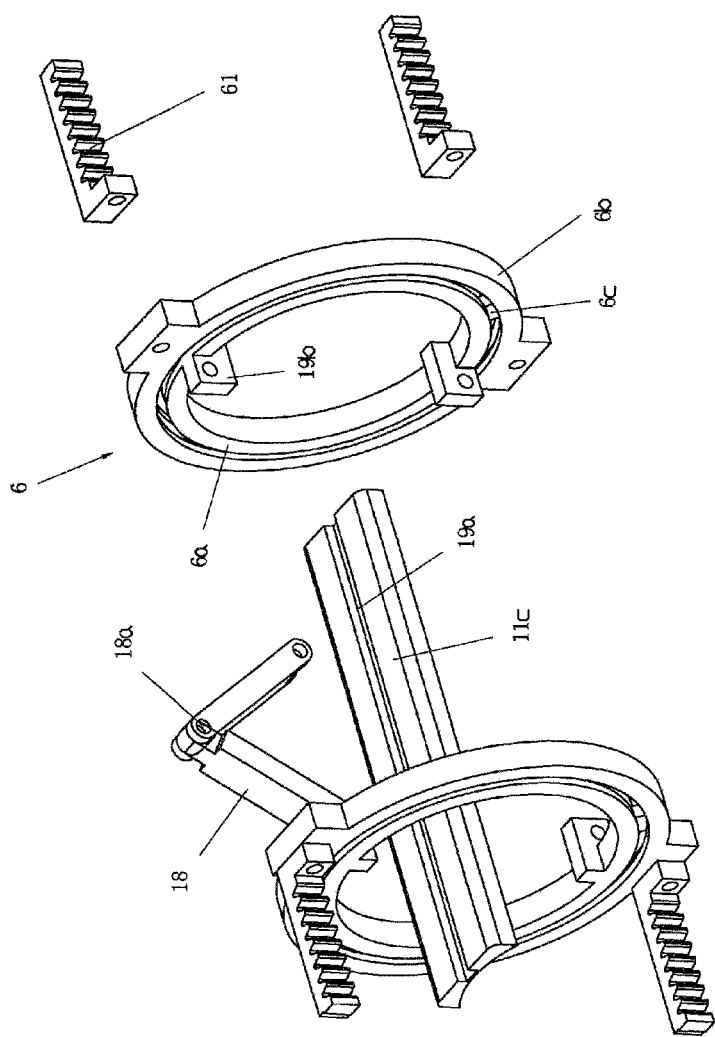
FIG. 8 is a schematic view showing an actuating ring according to example 2 of the invention.
Figure 9:
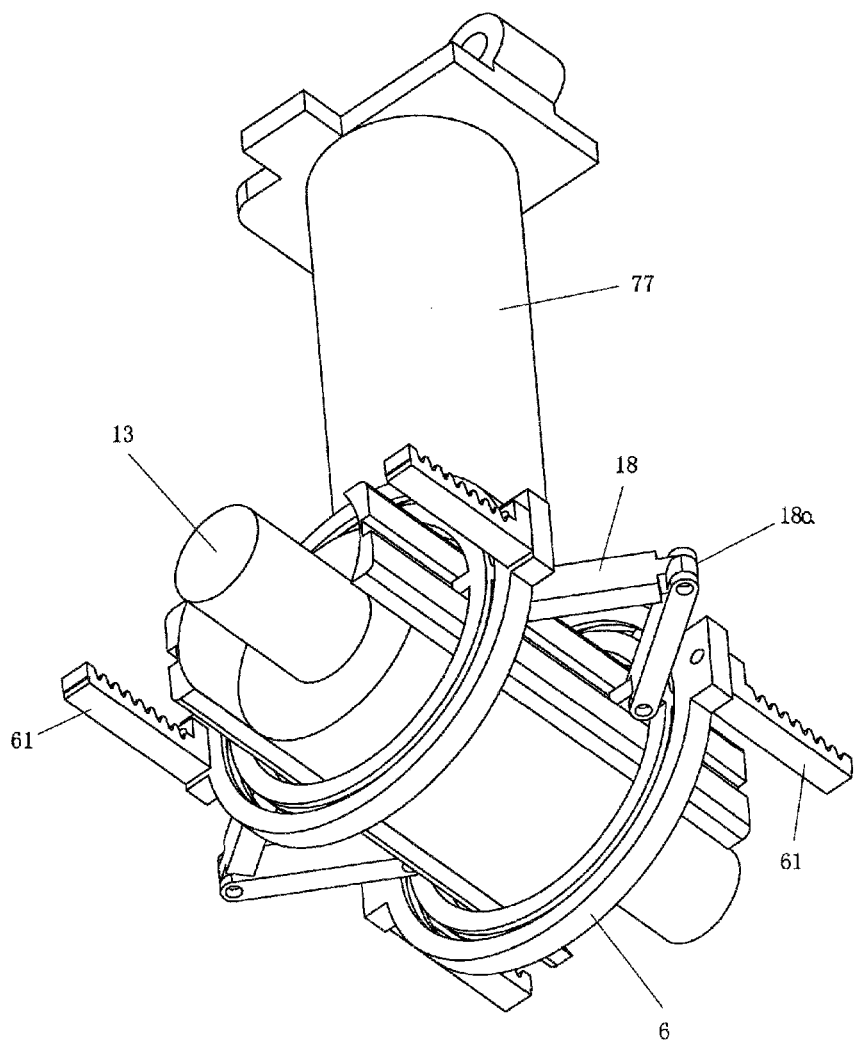
FIG. 9 is a schematic view showing a central actuating mechanism according to example 2 of the invention.

Further referring to FIGS. 8 and 9, an outer ring 6b is shown. An annular concave is formed in an interior of the outer ring 6b. Three supporting blocks 6c are fixed to an inner ring 6a which has an inner diameter less than that of the outer ring, and are arranged inside the annular concave of the outer ring 6b. As such, the outer and inner rings can only move by way of relative rotation and therefore constitute an actuating ring 6 which can move directionally along the axis of a bottom bracket.

A central actuating mechanism comprises two V-shaped movable rods 18. The hinge 18a of the V-shaped rods is movable. The both ends of the two V-shaped rods are hinged to the inner rings 6a of two actuating rings 6, respectively. A rack 61 is fixed on the outer ring for driving the control device downstream. A bottom bracket seat 11c is fixed on the bottom bracket, which is further provided with a guide rail 19a along which the actuating rings move. A locating block 19b corresponding to the locating guide rail is fixed on the inner ring of the actuating ring. Through toggling the hinge 18a of the V-shaped rods, the V-shaped rods drive the actuating rings to move directionally along the axis of the bottom bracket, such that the control assembly downstream is driven by a transmission mechanism.

Example 3

In this example, unlocking, pushing and rotating processes are driven by at least two racks, i.e., a gear mechanism. The separated and distributed discontinuously gear mechanism, i.e., more than two racks fixed with each other, can engage with gears in corresponding processes of disassembling and assembling pedal, under given procedures. As such, through driving the gear mechanism, the gear mechanism respectively drives gears corresponding to the unlocking, pushing and rotating processes according to the given procedures, such that the pedal can be disassembled and assembled by one step according to the procedures.

Figure 10:
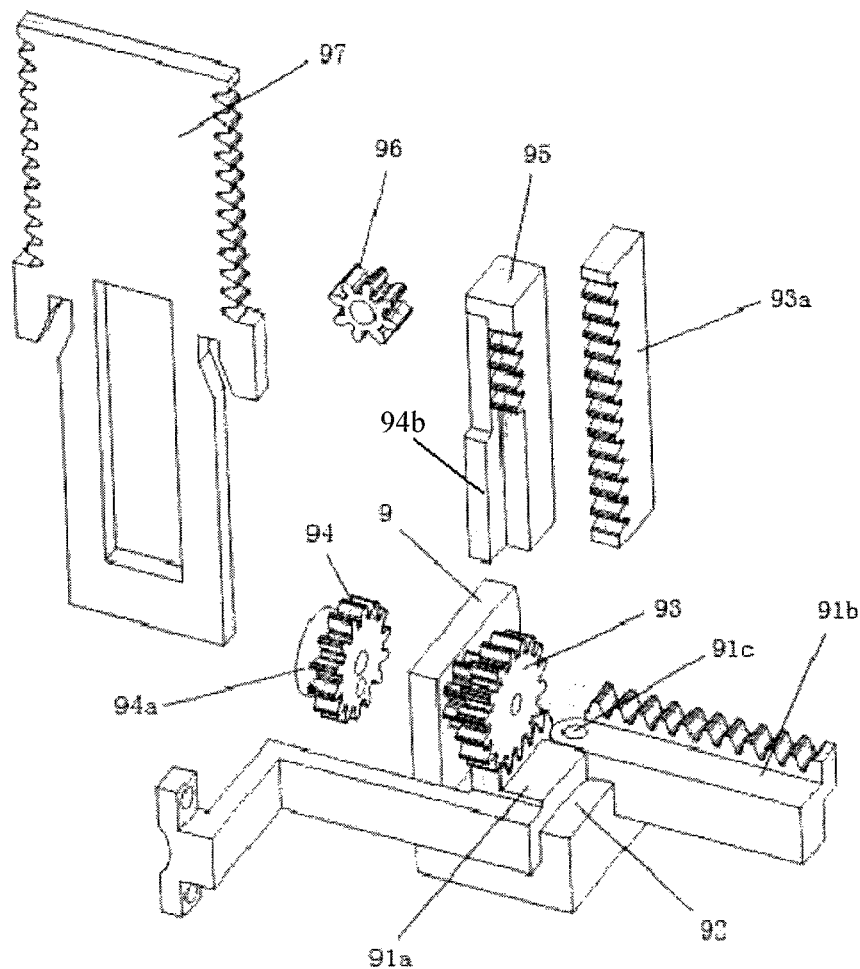
FIG. 10 is a perspective exploded view showing a structure of a control device which does not operate according to example 3 of the invention.
Figure 11:
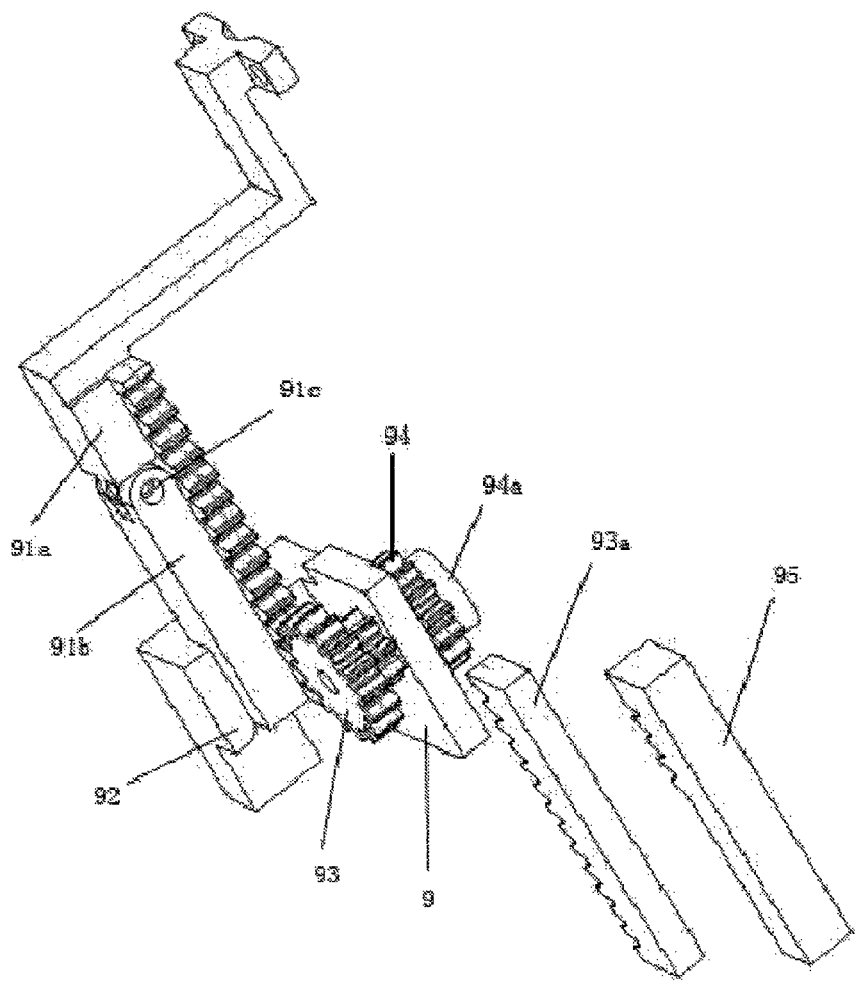
FIG. 11 is a perspective exploded view showing a structure of the control device which is operating according to example 3 of the invention.

As shown in FIGS. 10 and 11, the three steps of disassembling or assembling pedal are carried out by three independent racks respectively. The principle of the unlocking process is the same as that of example 1. In particular, a rack 93a is used for pushing the pedal to separate from the crank. A rack 95 makes it possible for the pedal separated from the crank to rotate, together with the fixing frame 9, relative to the crank. The racks 93a and 95 are fixed together to form a general actuating assembly. If the actuating direction of the unlocking bar is reverse to that of the general actuating assembly, the unlocking bar engages with the general actuating assembly consisting of the pushing rack 93a and the rotating rack 95 via an intermediate gear 96. Otherwise, if the actuating direction of the unlocking bar 97 is the same as that of the general actuating assembly, the unlocking bar, the pushing rack and the rotating rack may be fixed together to be a general actuating assembly as in example 1. The fixing frame 9 is pivotably joined with the fixing seat at the end of the crank as in example 1. A rotating gear 94 which rotates the fixing frame 9 is also fixed on the fixing frame 9. In addition, the rotating gear 94 is also provided with a limiting stopper 94a. The device for exiting the pedal from the bicycle crank comprises two racks 91a and 91b hinged to each other by one end. The rack 91a is fixed with the pedal at its unhinged end.

The two engaged racks are provided with a torsion spring at their hinge 91c, such that the teeth of the two racks are perpendicular to each other by the torsional force of the torsion spring when the pedal is not pushed. As such, the rack 91b will not strike on the bicycle chain.

If the actuating assembly is driven, the unlocking bar 97 carries out the unlocking process directly or indirectly. After the unlocking process finishes, the pushing rack 93a of the actuating assembly engages with a dual gear 93, and then drives the rack 91a engaged with the dual gear 93. At this time, an arc-shaped end 92 of the fixing frame 9, which contacts with the rack 91b, presses the rack 91b to escape from the torsional force of the torsion spring at the hinge 91c for hinging the rack 91a and the rack 91b, such that the teeth of the pushing rack 91b are parallel with those of the rack 91a. As such, the racks 91a and 91b form a continuous and complete rack, and are driven by the pushing rack 93a such that the pedal exits from the crank. The dual gear 93 is pivoted with the rotating gear 94 coaxially. In the pushing process, a protrusion 94b on the rotating rack 95 always contacts with the limiting stopper 94a on the rotating gear 94, which limits the rotating process. When the pedal is completely separated from the crank, the protrusion 94b on the rotating rack 95 is no longed limited by the limiting stopper 94a on the rotating gear 94. At this time, the rotating rack 95 drives the fixing frame 9 fixed with the rotating gear 94 to rotate together. Then, the pedal on the fixing frame 9 will rotates together with the fixing frame 9, which achieves the object of the present invention. The pushing process is carried out during the rotating process. That is to say, when the rotating rack 94b engages with the rotating gear 94, the pushing rack 93a also engages with the gear 93. This ensures the precision of the pushing rack 93a being engaging with the gear 93.

Figure 12:
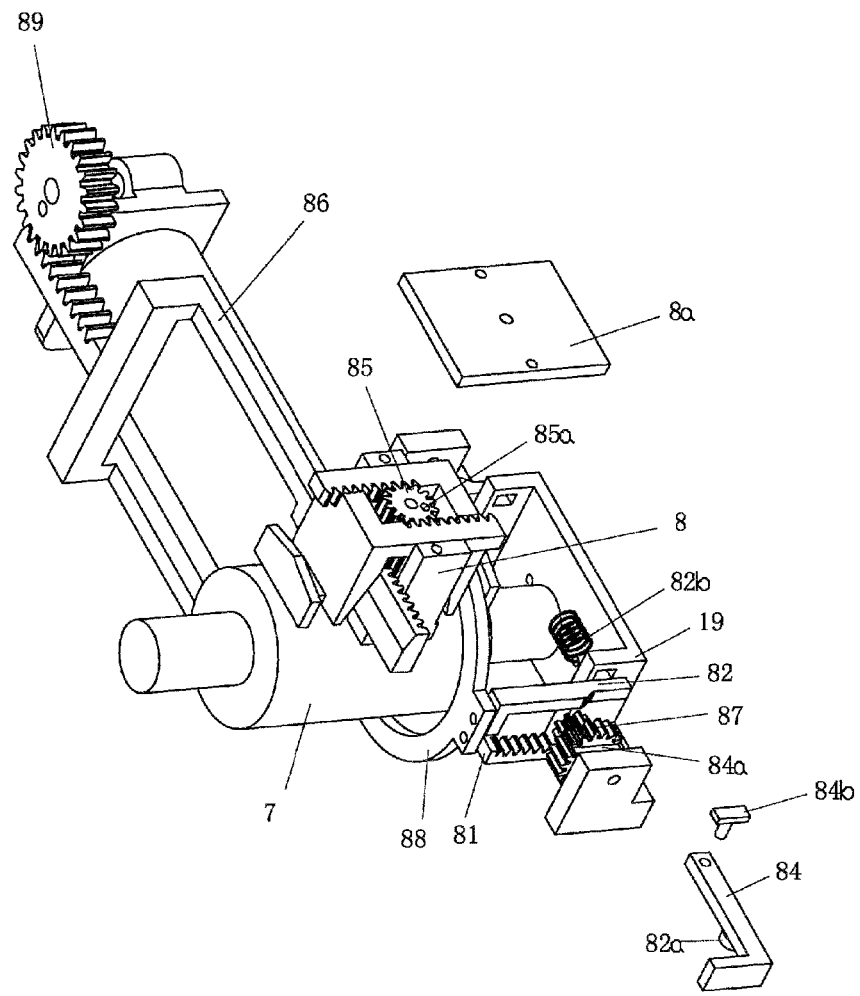
FIG. 12 is a partial perspective exploded schematic view of an assembly for controlling disassembling and assembling by one step according to example 3 of the invention.
Figure 13:
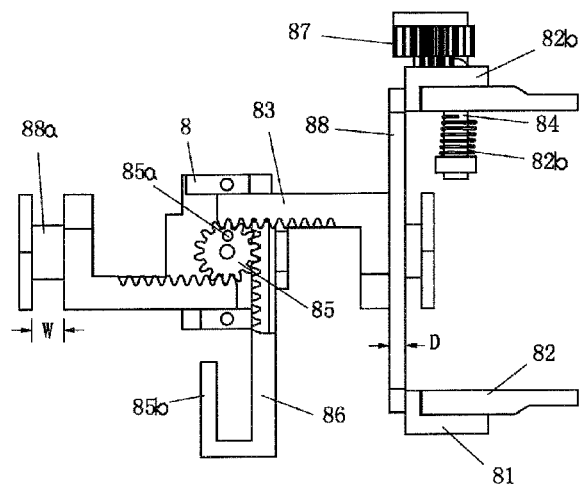
FIG. 13 is a perspective schematic view showing the structure of the assembly for controlling disassembling and assembling by one step which does not operate according to example 3 of the invention.
Figure 14:
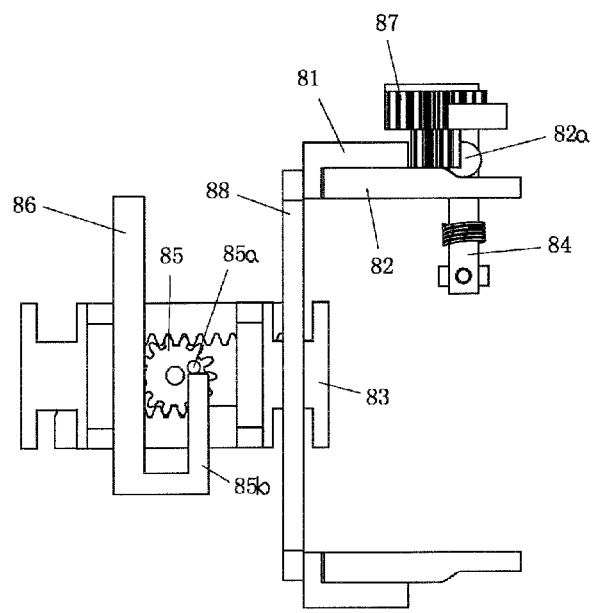
FIG. 14 is a perspective schematic view showing the structure of the assembly for controlling disassembling and assembling by one step after the pedal has been disassembled or assembled.

Referring to FIGS. 12, 13 and 14, the central actuating mechanism at the central axle of the bicycle comprises a fixing seat 8 fixed to the bottom bracket 7 of the bicycle and a fixing seat cap 8a. A gear 85 with a tuber 85a is pivoted to the fixing seat cap 8a. Moreover, the gear 85 engages with a pushing rack 83 and an actuating rack 86. A groove 88a which may contain an actuating ring 88 is formed at one end of the pushing rack 83. The groove 88a has a width W which is larger than the thickness D of the actuating ring 88. The actuating ring 88 has an interior being an annular shape. Furthermore, an unlocking bar 82 with depressed part and a rack 81 are fixed at one end in an exterior of the actuating ring 88. Alternatively, the actuating ring 88 may have an exterior being an annular shape. The unlocking bar 82 and the rack 81 are fixed at one end in an interior of the actuating ring 88. The rack 81 can engage with a dual gear 87 fixed on the fixing seat 19 which is arranged at the end of the crank, under given procedures. The dual gear 87 has a groove 84a which can engage with the locking bar 84. When the central actuating mechanism is not actuated, the groove 84a of the dual gear 87 engages with one end of the locking bar 84, the other end of the locking bar 84 is provided with a pin 84b for withstanding the spring 82b. This engagement is enforced by the spring 82b on the locking bar so as to ensure the lock-up state in which a rotation of the dual gear 87 is limited. At this time, the depressed on the unlocking bar 82 of the actuating ring 88 contacts with the circular protrusion 82a (which can be substituted by a bearing) on the locking bar 84, while the rack 81 on the actuating ring 88 is not engaged with the dual gear 87. Meanwhile, the groove 88a at one end of the pushing rack 83 does not contact with the actuating ring 88, while the actuating rack 86 is not engaged with the rack 85.

The seat post is bended such that a gear 89 fixed therewith drives the actuating rack 86. The actuating rack 86 then engages with the gear 85. The actuating rack 86 then drives the pushing rack 83 engaged with the gear 85, accordingly drives the actuating ring 88 to move. This causes the locking bar 84 to be disengaged from the groove 84a on the dual gear 87. The above steps are called the unlocking process. The unlocking process is performed by the bulge of the unlocking bar 82 fixed on the actuating ring 88 pressing upon the circular protrusion 82a of the locking bar 84. In this way, the unlocking bar 82 makes it possible for the locking bar 84 to escape from the elastic force of the spring 82b under pressure. Then the locking bar 84 disengages from the groove 84a on the dual gear 87, which achieves the unlocking purpose. In the unlocking process, the rack 81 fixed to the actuating ring 88 does not engage with the dual gear 87. When the circular protrusion 82a on the locking bar 84 is completely situated on the bulge of the unlocking bar 82, that is to say, only after the unlocking process completes, the rack 81 engages with the dual gear 87 to drive the transmission rack 44, such that the subsequent processes of disassembling and assembling pedal are performed.

In the restoring process of disassembling and assembling the pedal, the actuating rack 86 drives the pushing rack 83 so as to restore the actuating process downstream. If the actuating process downstream restores, the rack 81 fixed to the actuating ring 88 disengages from the dual gear 87. Meanwhile, the groove 84a of the dual gear 87 just rotates to engage with the locking bar 84. The locking bar 84 engages with the groove 84a of the dual gear 87 under the elastic force of the spring 82b, which achieves the lock-up purpose. When the actuating rack 86 engages with the gear 85, the groove 88a of the pushing rack 83 always engages with the actuating ring 88. Therefore, after the lock-up process finishes, the actuating rack 86 does not engage with the gear 85. At this time, the actuating ring no longer moves, while the groove 88a of the pushing rack 83 still engages with the actuating ring 88. If the actuating rack 86 is driven continuously, an end 85b of the actuating rack presses against the tuber 85a on the gear 88. This causes the gear 85 to rotate with a certain angle in a direction which is opposite to that in the restoring process, and therefore move a certain distance in a direction which is opposite to that in the former restoring process. As such, the actuating ring 88 does not contact with the groove 88a of the pushing rack 83 again so as to restore back to the initial actuating state. Accordingly, the object of the present invention is achieved.

The invention claimed is:

1. A device for disassembling and assembling pedals synchronously, comprising a locking mechanism for locking or unlocking a pedal (17) relative to a crank (1); a driving mechanism; at least two transmission racks (61; 81); two actuating rings (6; 88), each of which is connected with at least one of said at least two transmission racks (61; 81) so that the driving mechanism is rotatably connected with the at least two transmission racks (61; 81), wherein the driving mechanism drives each of the actuating rings to move in a direction parallel to an axis of the actuating rings; a motion mechanism, comprising: a connection assembly which is pivotably joined with the crank (1) at one end and connected with the pedal (17) at the other end; a motion control device for controlling the connection assembly so that the pedal (17) is displaced a predetermined distance and rotated a predetermined angle relative to the crank (1), wherein a driving effect of the driving mechanism is outputted to the motion control device at each end of a bottom bracket (7) through one of the at least two transmission racks connected with one of the two actuating rings (6; 88) and another of the at least two transmission racks connected with the other of the two actuating rings (6, 88), so that the pedals at both ends of the bottom bracket (7) are synchronously displaced a predetermined distance and rotated a predetermined angle relative to the crank (1), and wherein the motion control device at each end of the bottom bracket (7) is rotatable relative to the driving mechanism wherein the motion control device comprises:

a pushing control mechanism, configured to drive the pedal to displace relative to the crank, the pushing control mechanism comprising: a pushing rack (93a), a pushing driven rack, and a pushing transmission gear (93) is engaged with the pushing rack (93a) and the pushing driven rack, wherein the pushing driven rack comprises a first rack (91a) and a second rack (91b) hinged to each other, wherein the first rack (91a) or the second rack (91b) is fixed with the pedal (17) at unhinged end thereof, wherein the pushing driven rack and the pushing transmission gear (93) are arranged on a fixing frame (9) pivotably joined with a fixing seat; and a rotation control mechanism, configured to drive the pedal to rotate relative the crank, the rotation control mechanism comprising a rotating rack (95), a rotation transmission gear (94), and a rotation limiting mechanism (94b, 94a) configured to limit the rotating rack (95) from driving the rotation transmission gear (94) to rotate, wherein the pushing transmission gear (93) is coaxially pivoted with the rotation transmission gear (94); and wherein the rotation transmission gear (94) is fixed relative to the fixing frame (9).

2. The device as claimed in claim 1, wherein the driving mechanism comprises an actuating rack (74), a transmission gear (76) and two pushing racks (72), wherein the transmission gear (76) is engaged with the actuating rack (74) and the two pushing racks (72), wherein the two actuating rings (6) are connected with the two pushing racks (72), respectively.

3. The device as claimed in claim 1, wherein each actuating ring (6) comprises an outer ring (6a) and an inner ring (6b) which are rotatable relative to each other, wherein the at least two transmission racks (61) are fixed to the outer ring (6a), wherein the driving mechanism comprises at least one V-shaped rod (18), a hinge (18a) of the V-shaped rod (18) is movable, and both ends of the V-shaped rod (18) are hinged with the inner rings (6b) of the two actuating rings (6), respectively.

4. The central control device as claimed in claim 2, further comprising an actuating gear (77a) coaxially fixed with a seat post (77), wherein the actuating gear (77a) is engaged with the actuating rack (74) so as to transfer a movement of the seat post (77) to the actuating rack (74).

5. The central control device as claimed in claim 1, further comprising a driving transmission gear (44; 87) engaged with the at least two transmission racks (61; 81), wherein the driving effect of the driving mechanism outputted by the transmission racks (61; 81) is transferred by the driving transmission gear (44; 87).

6. The central control device as claimed in claim 5, further comprises:

a locking bar (84) and a groove (84a) which is arranged on the driving transmission gear (87), wherein the locking bar (84) and the groove (84a) can be engaged with each other to limit a rotation of the drive transmission gear (87); and an unlocking bar (82) which can press a protrusion (82a) of the locking bar (84) so that the locking bar (84) disengages from the groove (84a).

7. A device for disassembling and assembling pedals comprising:

a locking mechanism for locking or unlocking a pedal (17) relative to a crank (1);

a motion mechanism comprising a connection assembly which is pivotably joined with the crank (1) at one end and connected with the pedal (17) at the other end; a motion control device for controlling the connection assembly so that the pedal (17) is displaced a predetermined distance and rotated a predetermined angle relative to the crank (1), wherein the motion control device comprises:

a pushing control mechanism, configured to drive the pedal to displace relative to the crank, the pushing control mechanism comprising: a pushing rack (93a), a pushing driven rack, and a pushing transmission gear (93) is engaged with the pushing rack (93a) and the pushing driven rack, wherein the pushing driven rack comprises a first rack (91a) and a second rack (91b) hinged to each other, wherein the first rack (91a) or the second rack (91b) is fixed with the pedal (17) at unhinged end thereof; and a rotation control mechanism, configured to drive the pedal to rotate relative to the crank, the rotation control mechanism comprising a rotating rack (95) which is provided with a protrusion (94b), a rotation transmission gear (94) which is provided with a second limiting stopper (94a), wherein the second limiting stopper (94a) contacts with the protrusion (94b) to limit the rotating rack (95) from driving the rotation transmission gear (94) to rotate, wherein the pushing transmission gear (93) is coaxially pivoted with the rotation transmission gear (94);

wherein the rotation transmission gear (94) is fixed relative to a fixing frame (9).

8. The device as claimed in claim 7, wherein the motion control device comprises a driving rack (4), a driven rack (22), and a motion transmission gear (21) engaged with the driving rack (4) and the driven rack (22), wherein the connection assembly comprises: a first slider (31) connected with the pedal; a second slider (33) fixed on a support frame (2) which is pivotably joined to a fixing seat (11) at an end of the crank (1); and a linkage (3) which is hinged with the first slider (31) at one end and with the second slider (33) at the other end, wherein the driven rack (22) is hinged with the linkage (3) and drives the first slider (31) and the second slider (33) via the linkage (3) so that the pedal (17) is displaced relative to the crank (1), wherein the motion control device further comprises: a limiting mechanism (27, 23) for limiting a movement of the driven rack (22) and a limiting stopper (42) for limiting the driving rack (4) from driving the support frame (2) to rotate, wherein the limiting mechanism (27, 23) cooperates with the limiting stopper (42) so that the pedal (17) is rotated relative to the crank (1).

9. The device as claimed in claim 7, wherein the motion control device comprises a driving rack (4), a driven rack (223), and a motion transmission gear (221) engaged with the driving rack (4) and the driven rack (223), wherein the connection assembly comprises a linkage assembly (333), wherein the linkage assembly (333) has a first end pivotal joint (334) which is fixed with a fixing block (227) fixed to the pedal, and has a second end pivotal joint (333b) which is pivotably joined to a fixing frame (222) pivotably joined to a fixing seat at the end of the crank, and wherein the linkage assembly (333) has a first middle pivotal joint (223a) which is pivotably joined to the driven rack (223), and has a second middle pivotal joint (335) with which a post (227b) is hinged, the post (227*b*) movable in a groove (227*a*) of the fixing block 227, wherein the first end pivotal joint (334), the second end pivotal joint (333*b*), the first middle pivotal joint (223*a*) and the second middle pivotal joint (335) are collinear, wherein the line on which the first end pivotal joint (334), the second end pivotal joint (333*b*), the first middle pivotal joint (223*a*) and the second middle pivotal joint (335) are located is parallel to an axis of an axle of the pedal in the case of the pedal being not rotated relative to the crank.

* * * * *